United States Patent
Suh et al.

(10) Patent No.: US 8,379,470 B2
(45) Date of Patent: Feb. 19, 2013

(54) SEMICONDUCTOR MEMORY DEVICES, CONTROLLERS, AND SEMICONDUCTOR MEMORY SYSTEMS

(75) Inventors: Sung-dong Suh, Seoul (KR); Kyoung-ho Ha, Seoul (KR); Seong-gu Kim, Pyeongtaek-si (KR); Soo-haeng Cho, Suwon-si (KR); In-sung Joe, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 179 days.

(21) Appl. No.: 12/855,409

(22) Filed: Aug. 12, 2010

(65) Prior Publication Data

US 2011/0038221 A1 Feb. 17, 2011

(30) Foreign Application Priority Data

Aug. 12, 2009 (KR) .................. 10-2009-0074280

(51) Int. Cl.
*G11C 13/04* (2006.01)

(52) U.S. Cl. ........................................ 365/215; 365/122

(58) Field of Classification Search .................. 365/215; 385/122
See application file for complete search history.

(56) References Cited

U.S. PATENT DOCUMENTS

| 7,474,827 B2* | 1/2009 | Handelman .................. 385/122 |
| 7,489,875 B2* | 2/2009 | Murphy ........................ 398/164 |
| 2003/0043426 A1 | 3/2003 | Baker et al. |

FOREIGN PATENT DOCUMENTS

| JP | 2007-219852 | 8/2007 |
| JP | 2007-328599 | 12/2007 |

\* cited by examiner

*Primary Examiner* — Son Dinh
*Assistant Examiner* — Nam Nguyen
(74) *Attorney, Agent, or Firm* — Harness, Dickey & Pierce, P.L.C.

(57) ABSTRACT

A semiconductor memory system includes a controller and a memory device that are optical-interconnected. The controller includes a control logic configured to generate a control signal for controlling the memory device and a transmitter configured to convert the control signal into an optical signal, and output the optical signal. The memory device includes a receiving unit filter configured to convert the optical signal into an electric signal, and the electric signal based on a supply voltage corresponding to a period of the optical signal or the electric signal.

16 Claims, 5 Drawing Sheets

SEMICONDUCTOR MEMORY DEVICES, CONTROLLERS, AND SEMICONDUCTOR MEMORY SYSTEMS

CROSS-REFERENCE TO RELATED APPLICATIONS

This nonprovisional U.S. application claims priority under 35 U.S.C. §119 to Korean Patent Application No. 10-2009-0074280, filed on Aug. 12, 2009, in the Korean Intellectual Property Office, the entire contents of which are incorporated herein by reference.

BACKGROUND

Inventive concepts relate to semiconductor memory devices, controllers, and semiconductor memory systems, and more particularly, to a semiconductor memory device, which interfaces between a memory controller and a memory that operates at high speed by using an optical link, a controller, and a semiconductor memory system.

Unlike an electric signal, an optical signal is sensitive to a mark ratio of 0 to 1. When a signal having a format not having a 1:1 mark ratio of 0 to 1 is transmitted, a receiver may not accurately process the signal.

SUMMARY

Inventive concepts provide semiconductor memory devices, which interface between a memory controller and a memory that operates at high speed by using an optical link, controllers, and semiconductor memory systems.

According to an aspect of inventive concepts, there is provided a semiconductor memory system including a controller and a memory device that are optical-interconnected. The controller includes a control logic configured to generate a control signal controlling the memory device and a transmitter configured to convert the control signal into an optical signal and output the optical signal. The memory device includes a receiving unit configured to convert the optical signal into an electric signal, filter the electric signal based on a supply voltage corresponding to a period of the optical signal or the electric signal.

The receiving unit of the memory device may include a receiver configured to convert the optical signal into an electric signal, and detect the period of the optical signal or the electric signal, a signal pass filter configured to receive the supply voltage, and pass a signal component of the electric signal having a higher voltage than a reference voltage, a regulator configured to receive information about the detected period of the optical signal or the electric signal, and maintain a voltage level of the reference voltage regardless of the period of the optical signal or the electric signal by transmitting the supply voltage corresponding to the period of the optical signal or the control signal to the signal pass filter, and a voltage level converter configured to convert a voltage level of the component of the electric signal passed through the signal pass filter into a voltage level for the memory device.

The controller may further include a receiving unit configured to receive a response signal corresponding to the control signal from the memory device, convert the response signal into a second electric signal, detect a period of the response signal, filter the second electric signal based on a second supply voltage corresponding to the period of the response signal.

The receiving unit of the controller may include a receiver configured to convert the response signal into the second electric signal, and detect the period of the response signal, a signal pass filter configured to receive the second supply voltage, and pass a signal component of the second electric signal having a higher voltage than a reference voltage, a regulator configured to receive information about the detected period of the response signal from the receiver, and maintain a voltage level of the reference voltage regardless of the period of the response signal by transmitting the second supply voltage to the signal pass filter, and a voltage level converter configured to convert a voltage level of the second electric signal passed through the signal pass filter into a voltage level for the controller.

The memory device may further include a transmitter configured to convert a response signal corresponding to the control signal into a second optical signal, and output the second optical signal.

The controller and the memory device may be connected to an optical fiber waveguide, a polymer waveguide, or a printed circuit board (PCB).

According to another aspect of inventive concepts, there is provided a controller that is optical-interconnected to a memory device and configured to control the memory device. The controller includes a control logic configured to generate a control signal for controlling the memory device and receive a filtered electric signal from a receiving unit, a transmitter configured to convert the control signal into an optical signal and output the optical signal, and the receiving unit configured to receive a response signal corresponding to the control signal from the memory device, detect a period of the response signal, convert the response signal into an electric signal, filter the electric signal based on a supply voltage corresponding to the period of the response signal and transmit the filtered electric signal to the control logic.

According to another aspect of inventive concepts, there is provided a semiconductor memory device that is optical-interconnected to a controller, and configured to perform a read or write operation according to a control signal received from the controller. The semiconductor memory device includes a receiving unit configured to convert the control signal into an electric signal and filter the electric signal based on a supply voltage corresponding to a period of the control signal.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

The attached drawings for illustrating example embodiments of inventive concepts are referred to in order to gain a sufficient understanding of inventive concepts, the merits thereof, and objectives accomplished by the implementation of inventive concepts.

Hereinafter, inventive concepts will be described in detail by explaining example embodiments with reference to the attached drawings. In the drawings, lengths and sizes of layers and regions may be exaggerated for clarity. Like reference numerals in the drawings denote like elements.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
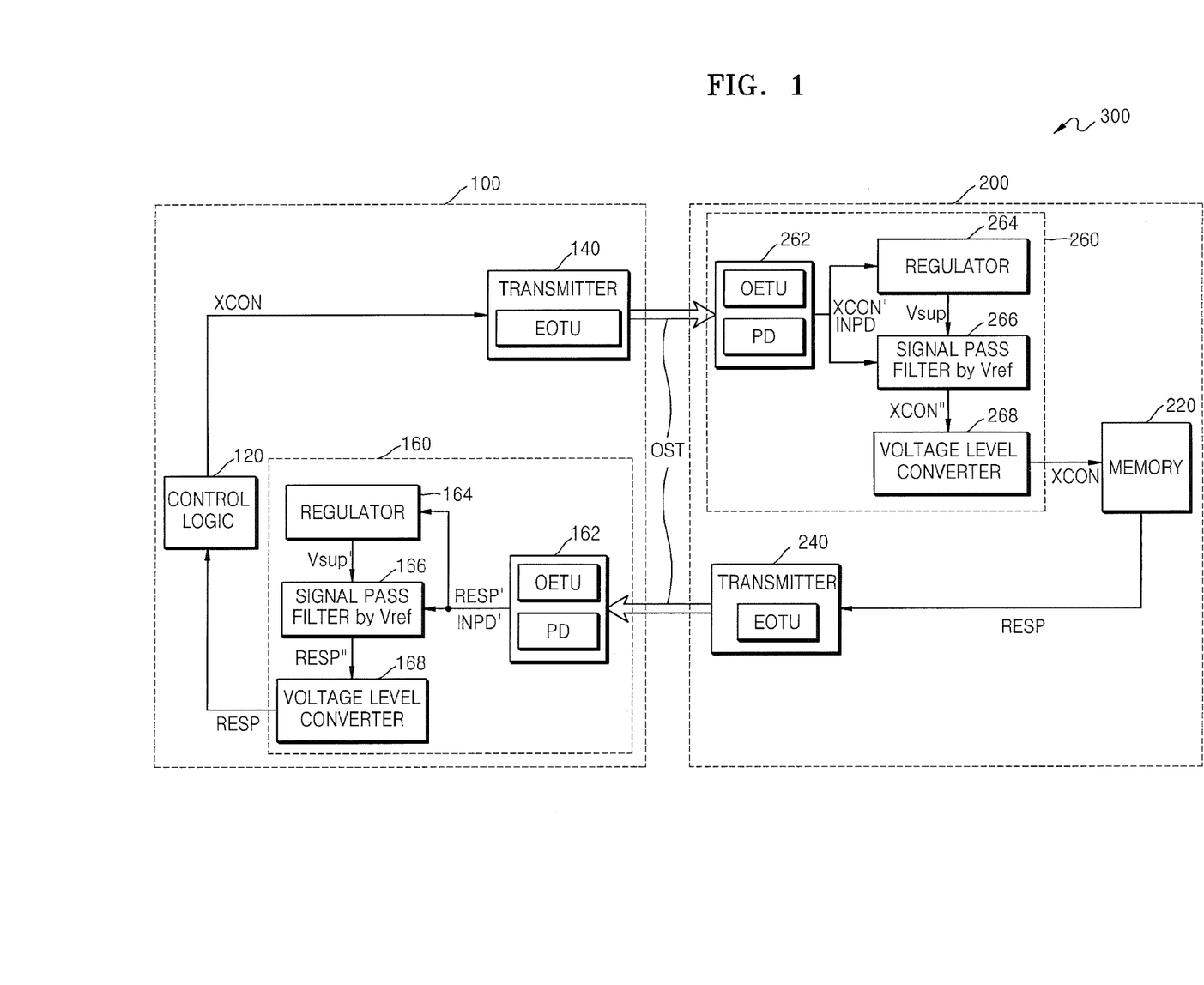
FIG. 1 is a block diagram of a semiconductor memory system according to an example embodiment of inventive concepts.

FIG. 1 is a block diagram of a semiconductor memory system 300 according to an example embodiment of inventive concepts. Referring to FIG. 1, the semiconductor memory system 300 includes a controller 100 and a memory device 200.

The controller 100 may apply a control signal XCON for controlling the memory device 200 to the memory device 200. For example, the control signal XCON may be a write or read command containing an address, data, or the like for the memory device 200.

Upon receiving the control signal XCON from the controller 100, the memory device 200 may write data on a memory 220 or read data from the memory 220. The memory device 200 may transmit a response signal RESP corresponding to the control signal XCON to the controller 100.

A control logic 120 of the controller 100 may generate the control signal XCON. The control logic 120 may be a memory control unit (MCU) or a field programmable gate array (FPGA).

The control signal XCON may be an electric signal. The control signal XCON generated by the control logic 120 may be converted into an optical signal by a transmitter 140 of the controller 100. More specifically, the transmitter 140 of the controller 100 may include an electric-optical signal transforming unit EOTU that converts an electric signal into an optical signal.

The response signal RESP may also be an electric signal. The response signal RESP may be converted into an optical signal, by a transmitter 240 of the memory device 200. More specifically, the transmitter 240 of the memory device 200 may include an electric-optical signal transforming unit EOTU that converts an electric signal into an optical signal.

A structure and an operation of the electric-optical signal transforming units EOTU are known to one of ordinary skill in the art, and thus detailed descriptions thereof are omitted herein.

The optical signal output from the transmitter 140 of the controller 100 may be transmitted to the memory device 200 through an optical channel OST. Similarly, the optical signal output from the transmitter 240 of the memory device 200 may be transmitted to the controller 100 through the optical channel OST.

The optical channel OST, which transfers at least one signal between the controller 100 and the memory device 200 via optical communication, may be a waveguide. Here, the waveguide may be an optical fiber that transmits light without dispersion, a polymer waveguide, or a printed circuit board (PCB).

A receiving unit 160 of the controller 100 converts the received optical signal into an electric signal. Accordingly, the receiving unit 160 of the controller 100 may include an optical-electric signal transforming unit OETU that converts an optical signal into an electric signal.

Similarly, a receiving unit 260 of the memory device 200 converts the received optical signal into an electric signal. Accordingly, the receiving unit 260 of the memory device 200 may include an optical-electric signal transforming unit OETU that converts an optical signal into an electric signal. A structure and an operation of the optical-electric signal transforming units OETU are well known to one of ordinary skill in the art, and thus detailed descriptions thereof are omitted herein.

As such, optical-interconnection between a memory controller (or a processor) and a memory device in a semiconductor memory system via optical signal transmission and reception has come into the spotlight, because interest in high speed connection (interface) between devices to improve performance of a semiconductor memory system is increasing.

Generally, performance of a microelectronic integrated circuit-based computing system is limited by performance of a communication link connecting devices, rather than performance of each device forming the computing system. Accordingly, performance of a computer depends on a data transmission rate between a memory device and a memory controller, rather than performance of a microprocessor.

A transmission rate via optical-interconnections between a memory controller and a memory device is remarkably higher than a transmission rate when an electric signal is used. However, optical-interconnections are used in long distance communication, and may bring about a problem when an electric signal used in a board level or a chip level is transmitted as an optical signal.

Figure 2:
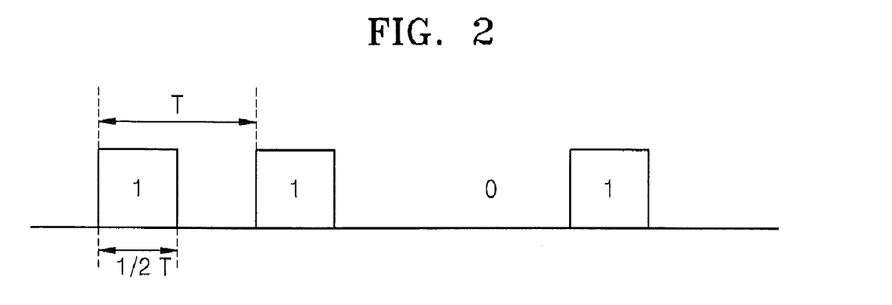
FIG. 2 is a diagram of a return to zero (RZ) method of an optical signal transmitted through an optical channel of FIG. 1 according to an example embodiment.
Figure 3:
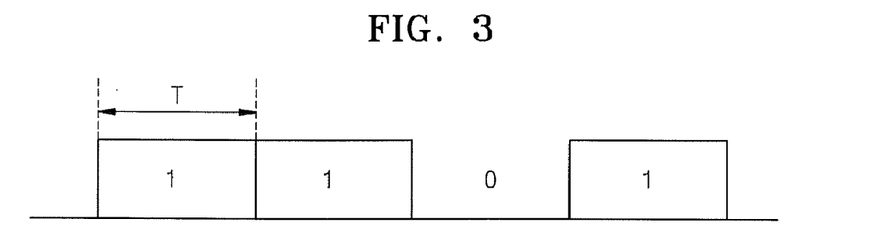
FIG. 3 is a diagram of a non return to zero (NRZ) method of an optical signal transmitted through an optical channel of FIG. 1 according to an example embodiment.

Examples of coding methods used in optical-communication include a return to zero (RZ) method illustrated in FIG. 2, and a non return to zero (NRZ) method illustrated in FIG. 3.

In the RZ method of FIG. 2, data "0" or "1" is transmitted for half a period (½ T) and data "0" is transmitted for the rest of the period. In the RZ method, when a signal is processed for data having continuous "0", an error may be generated due to noise.

In the NRZ method of FIG. 3, data "0" or "1" is transmitted for a whole period (T). In the NRZ method, when a signal is processed for data having continuous "1" or "0", an error may be generated due to noise.

When a signal having a format not having a 1:1 mark ratio of 0 to 1 is transmitted as an optical signal, the signal may be incorrectly processed due to noise, or the like.

Referring back to FIG. 1, when the controller 100 or the memory device 200 of the semiconductor memory system 300 processes an optical signal, a period of the optical signal is detected, and the level of a supply voltage is adjusted to correspond to the period of the optical signal.

This will be described in detail.

In response to the control signal XCON, the receiving unit 160 of the controller 100 may receive the response signal RESP from the memory device 200 as an optical signal, detect a period of the optical signal, operate using a supply voltage Vsup' at a level corresponding to the period of the optical signal, filter the response signal RESP, and convert the optical signal into an electric signal RESP' that is used in the control logic 120. Here, the receiving unit 160 of the controller 100 may include a receiver 162, a regulator 164, a signal pass filter 166, and a voltage level converter 168, as shown in FIG. 1. The receiver transmits information INPD' corresponding to the period of the optical signal to the signal pass filter 166.

Similarly, the receiving unit 260 of the memory device 200 may receive the control signal XCON from the controller 100 as an optical signal, detect a period of the optical signal, operate using a supply voltage at a level corresponding to the period of the optical period, filter a control signal XCON', and convert the optical signal to an electric signal that is used in the memory 220. The received optical signal is converted to an electric signal which is the control signal XCON'. Here, the receiving unit 260 of the memory device 200 may include a receiver 262, a regulator 264, a signal pass filter 266, and a voltage level converter 268 as shown in FIG. 1.

Here, the receiver 162, the regulator 164, the signal pass filter 166, and the voltage level converter 168 included in the receiving unit 160 of the controller 100 may be respectively identical to the receiver 262, the regulator 264, the signal pass filter 266, and the voltage level converter 268 included in the receiving unit 260, respectively, of the memory device 200. Accordingly, for convenience of description, only the receiving unit 260 of the memory device 200 is described.

As described above, the receiver 262 includes the optical-electric signal transforming unit OETU so as to convert an optical signal into an electric signal. Also, the receiver 262 may include a period detector PD that generates signal period information INPD by detecting a period of the received optical signal or the electric signal.

Figure 4:
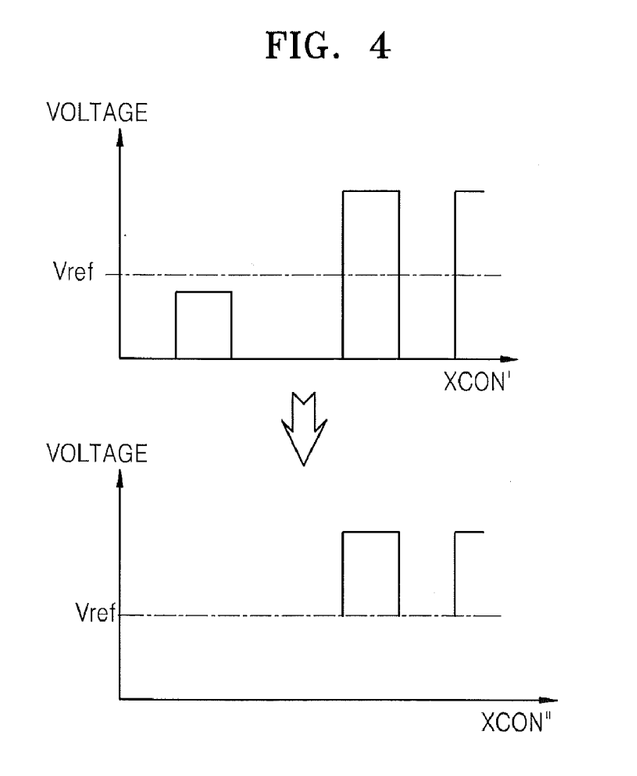
FIG. 4 is a diagram of an operation of a signal pass filter of FIG. 1 according to an example embodiment.

FIG. 4 is a diagram for describing an operation of the signal pass filter 266 of FIG. 1. As shown in FIG. 4, the signal pass filter 266 passes a signal having a voltage greater than a reference voltage Vref, in order to remove a noise component included in the electric signal. Considering that a signal having a format not having a 1:1 mark ratio of 0 to 1 is received, the reference voltage Vref may be set to about 1.025 V when a DDR2 type memory device is tested.

The regulator 264 receives the signal period information INPD from the receiver 262, and transmits a supply voltage Vsup corresponding to the signal period information INPD to the signal pass filter 266. The signal pass filter 266 operates at the supply voltage Vsup, and filters out a signal component (noise) equal to or below the reference voltage Vref. For example, the regulator 264 may set the supply voltage Vsup to have a low value with respect to a signal having a long period, such as a signal having continuous "0" or "1", i.e., a signal having a format not having a 1:1 mark ratio and thus may have a noise component.

Accordingly, the signal pass filter 266 according to the current embodiment can uniformly maintain the reference voltage Vref regardless of a period of a signal to be filtered. Thus, an error generated by a reference voltage changed according to a period of a signal, wherein the reference voltage is a reference for removing a noise component, is prevented.

Figure 5:
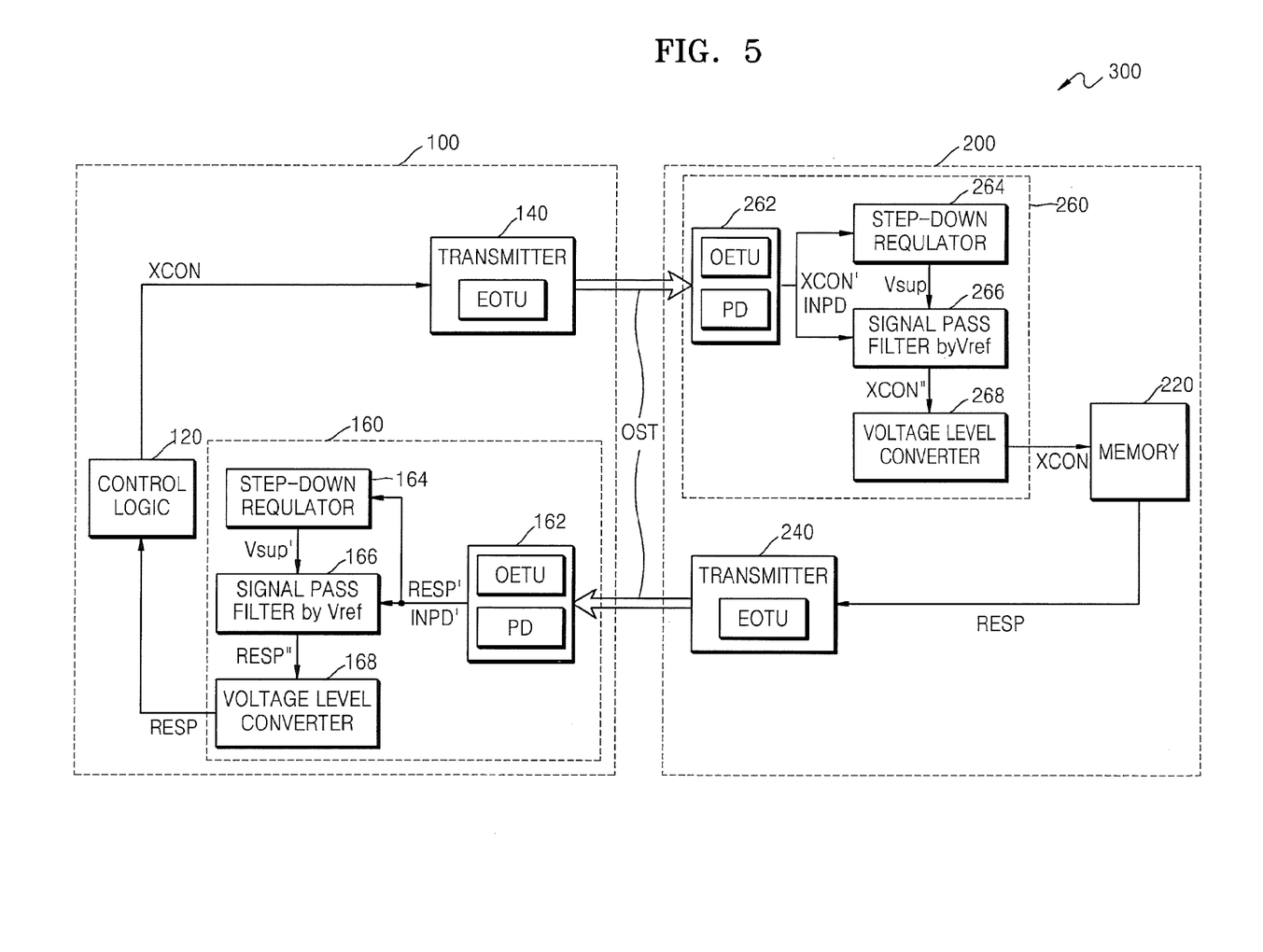
FIG. 5 is a diagram of a regulator according to an example embodiment.

FIG. 5 is a diagram for describing an embodiment of the regulator 264 of FIG. 1. As shown in FIG. 5, the regulator 264 of FIG. 1 may be a step-down regulator that decreases the level of a voltage, which has good power efficiency and stability.

Figure 6:
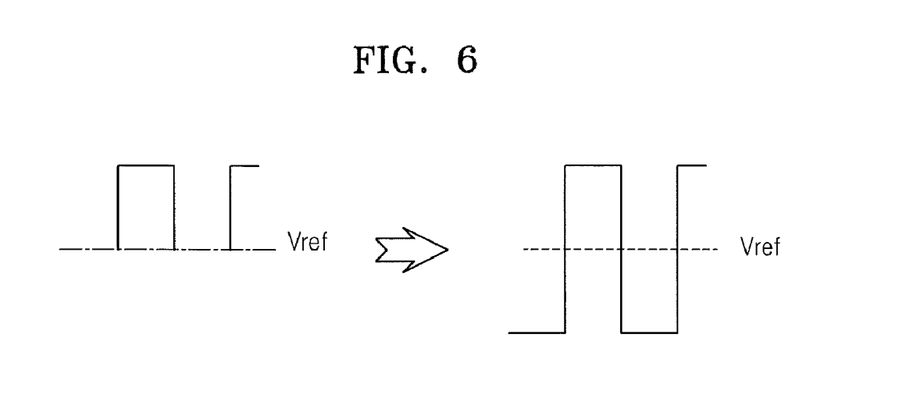
FIG. 6 is a diagram for describing an operation of a voltage level converter according to an example embodiment.

FIG. 6 is a diagram for describing an operation of the voltage level converter 268 of FIG. 1. As shown in FIG. 6, the voltage level converter 268 converts a voltage level of an electric signal XCON" that passed through the signal pass filter 266 into a voltage level that can be applied to the memory 220. The electric signal XCON that is output from the voltage level converter 268 may be transmitted to the memory 220. A voltage level that can be applied to a memory is prescribed according to a specification of the memory, and thus detailed descriptions are omitted herein.

As such, a semiconductor memory device, a controller, and a semiconductor memory system according to inventive concepts change a voltage level used to process a signal, according to a period of the signal, and thus a memory and a memory controller that operate at high speeds by using an optical link may be accurately interfaced.

Figure 7:
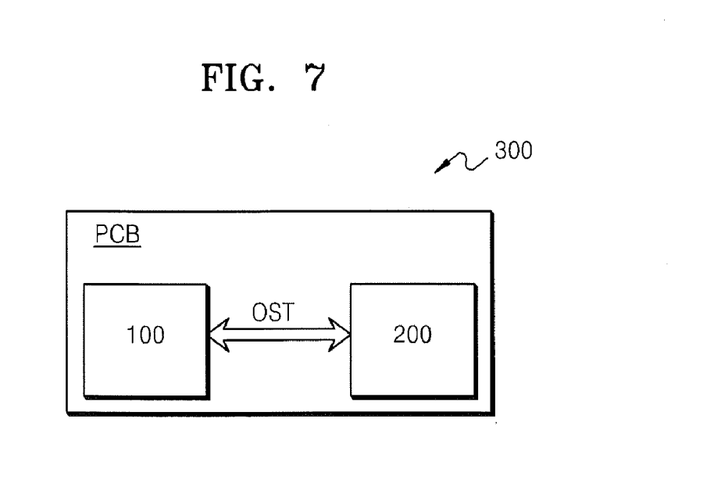
FIG. 7 is a diagram for describing a semiconductor memory system of FIG. 1 formed on a printed circuit board (PCB) according to an example embodiment.

FIG. 7 is a diagram for describing the semiconductor memory system 300 of FIG. 1 formed in a PCB. As shown in FIG. 7, the semiconductor memory system 300 may interconnect the controller 100 and the memory device 200 by using an optical channel OST formed on the PCB.

Figure 8:
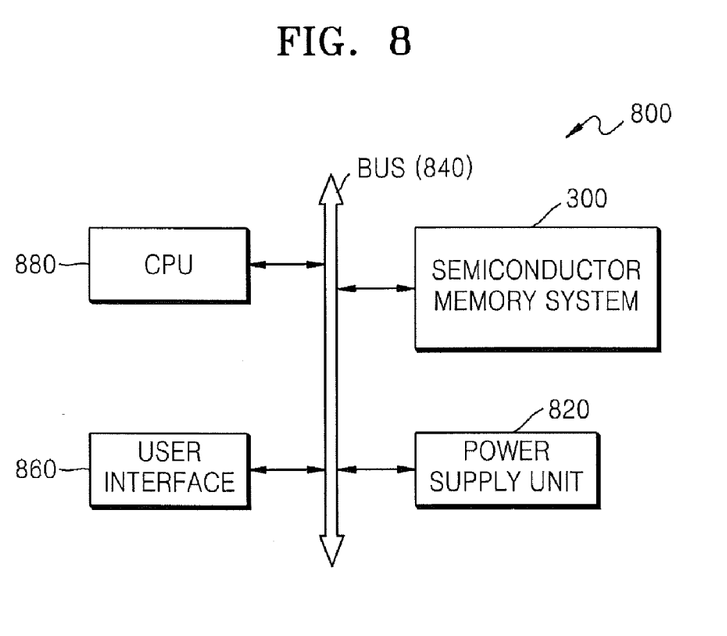
FIG. 8 is a diagram illustrating a computing system including a semiconductor memory system, according to an example embodiment of inventive concepts.

FIG. 8 is a diagram illustrating a computing system 800 including the semiconductor memory system 300 of FIG. 1, according to an embodiment of inventive concepts. Referring to FIG. 8, the semiconductor memory system 300 is connected to a central processing unit (CPU) 880, a power supply unit 820, and a user interface 860 via a bus 840.

Figure 9:
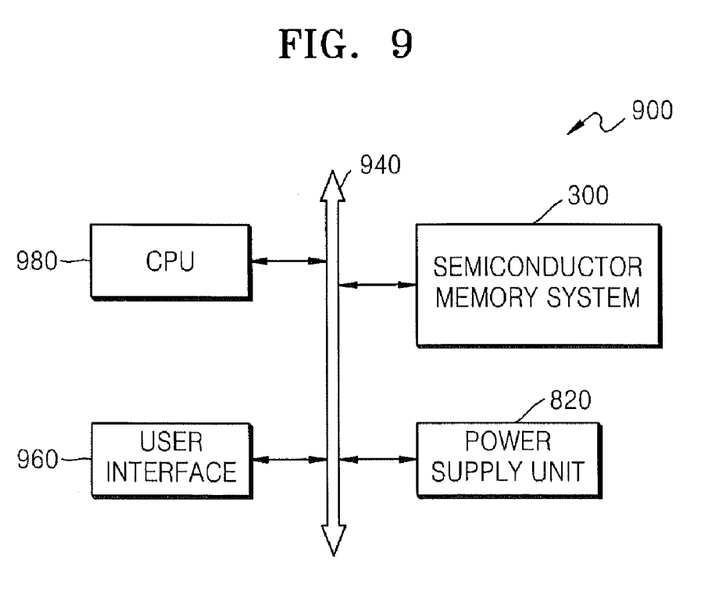
FIG. 9 is a diagram illustrating a computing system including a semiconductor memory system, according to another example embodiment of inventive concepts.

FIG. 9 is a diagram illustrating a computing system 900 including the semiconductor memory system 300 of FIG. 1, according to another embodiment of inventive concepts. Referring to FIG. 9, like the computing system 800 of FIG. 8, the semiconductor memory system 300 is connected to a CPU 980, a power supply unit 920, and a user interface 960 via an optical channel 940.

That is, in the computing system 900, optical-interconnections between the controller 100 and the memory device 200 of the semiconductor memory system 300 are also applied to the semiconductor memory system 300 and the CPU 980.

Terms used herein are only for descriptive purposes only, and are not used to limit the meaning or the range of inventive concepts.

For example, the semiconductor memory in the semiconductor memory system according to the embodiments of inventive concepts may be a flash memory. The flash memory is a non-volatile memory device that maintains stored data even when power supply is cut. As the use of mobile devices, such as cellular phones, personal digital assistants (PDA), digital cameras, portable game consoles, and MP3 players, increases, a flash memory device is widely used not only as a data storage unit, but also as a code storage unit. The flash memory device may be used in home application, such as a high definition television (HDTV), a digital versatile disc (DVD), a router, and a global positioning system (GPS).

The semiconductor memory system may be applied to an application including a flash memory, such as a solid state drive/disk (SSD).

The semiconductor memory and the memory controller of the semiconductor memory system according to the embodiments of inventive concepts may be realized as a memory card. Here, the memory controller may be configured to communicate with an external device, such as a host, through one of various interface protocols, such as a universal serial bus (USB), a multi-media card (MMC), peripheral component interconnect express (PCI-E), a serial advanced technology attachment (SATA), parallel advanced technology attachment (PATA), a small computer system interface (SCSI), an enhanced small disk interface (ESDI), and integrated drive electronics (IDE). Besides the flash memory and the memory controller, the memory card may further include a CPU, a static RAM (SRAM), a host interface (I/F), an ECC, a memory I/F, and a bus. Here, a structure and an operation of each element of the memory card are well known to one of ordinary skill in the art, and thus detailed descriptions thereof are omitted herein.

Moreover, a memory system, a memory test system, and a flash memory device using a memory test method may be mounted on a package having any of various forms. For example, the flash memory device may be mounted on a package, such as package on package (PoP), a ball grid array (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline integrate chip (SOIC), a shrink small outline package (SSOP), a thin small outline package (TSOP), a thin quad flatpack (TQFP), a system in package (SIP), a multi chip package (MCP), a wafer-level fabricated package (WFP), or a wafer-level processed stack package (WSP).

While inventive concepts have been particularly shown and described with reference to example embodiments thereof, it will be understood that various changes in form and details may be made therein without departing from the spirit and scope of the following claims.

What is claimed is:

1. A semiconductor memory system comprising:
   a controller optically coupled to a memory device, the controller including,
      a control logic configured to generate a control signal for controlling the memory device, and
      a transmitter configured to convert the control signal into an optical signal, and output the optical signal;
   the memory device including a receiving unit configured to convert the optical signal into an electric signal and filter the electric signal based on a supply voltage corresponding to a period of the optical signal or the electric signal, wherein the receiving unit of the memory device includes,
      a receiver configured to convert the optical signal into the electric signal, and detect the period of the optical signal or the electric signal, and
      a signal pass filter configured to receive the supply voltage, and pass a signal component of the electric signal having a higher voltage than a reference voltage.

2. The semiconductor memory system of claim 1, wherein the receiving unit of the memory device further comprises:
   a regulator configured to receive information about the detected period of the optical signal or the electric signal from the receiver, and maintain a voltage level of the reference voltage regardless of the period of the electric signal or the optical signal by transmitting the supply voltage to the signal pass filter.

3. The semiconductor memory system of claim 2, wherein the receiving unit of the memory device further comprises:
   a voltage level converter configured to convert a voltage level of the signal component of the electric signal passed through the signal pass filter into a voltage level for the memory device.

4. The semiconductor memory system of claim 1, wherein the controller further comprises:
   a receiving unit configured to receive a response signal corresponding to the control signal from the memory device, convert the response signal into a second electric signal, detect a period of the response signal, and filter the second electric signal based on a second supply voltage corresponding to the period of the response signal.

5. The semiconductor memory system of claim 4, wherein the receiving unit of the controller comprises:
   a receiver configured to convert the response signal into the second electric signal, and detect the period of the response signal.

6. The semiconductor memory system of claim 5, wherein the receiving unit of the controller further comprises:
   a signal pass filter configured to receive the second supply voltage, and pass a signal component of the second electric signal having a higher voltage than a reference voltage.

7. The semiconductor memory system of claim 6, wherein the receiving unit of the controller further comprises:
   a regulator configured to receive information about the detected period of the response signal from the receiver, and maintain a voltage level of the reference voltage regardless of the period of the response signal by transmitting the second supply voltage to the signal pass filter.

8. The semiconductor memory system of claim 7, wherein the receiving unit of the controller further comprises:
   a voltage level converter configured to convert a voltage level of the signal component of the second electric signal passed through the signal pass filter into a voltage level for the controller.

9. The semiconductor memory system of claim 1, wherein the memory device further comprises:
   a transmitter configured to convert a response signal corresponding to the control signal into a second optical signal, and output the second optical signal.

10. The semiconductor memory system of claim 1, wherein the controller and the memory device are connected to an optical fiber waveguide, a polymer waveguide, or a printed circuit board (PCB).

11. A controller optical-interconnected to a memory device and configured to control the memory device, the controller comprising:
- a control logic configured to generate a control signal for controlling the memory device based on a filtered electric signal;
- a transmitter configured to convert the control signal into an optical signal and output the optical signal; and
- a receiving unit configured to receive a response signal corresponding to the control signal from the memory device, detect a period of the response signal, convert the response signal into an electric signal, filter the electric signal based on a supply voltage corresponding to the period of the response signal and transmit the filtered electric signal to the control logic, wherein the receiving unit includes,
  - a receiver configured to convert the response signal into the electric signal, and detect the period of the response signal, and
  - a signal pass filter configured to receive the supply voltage, and pass a signal component of the electric signal having a higher voltage than a reference voltage.

12. The controller of claim 11, wherein the receiving unit of the controller comprises:
- a regulator configured to receive information about the detected period of the response signal from the receiver, and maintain a voltage level of the reference voltage regardless of the period of the response signal by transmitting the supply voltage corresponding to the period of the response signal to the signal pass filter; and
- a voltage level converter configured to convert a voltage level of the signal component of the electric signal passed through the signal pass filter into a voltage level for the controller.

13. A semiconductor memory device optical-interconnected to a controller, and configured to perform a read or write operation according to a control signal received from the controller, the semiconductor memory device comprising:
- a receiving unit configured to convert the control signal into an electric signal and filter the electric signal based on a supply voltage corresponding to a period of the control signal, wherein the receiving unit of the memory device includes,
  - a receiver configured to convert the control signal into the electric signal, and detect the period of the control signal, and
  - a signal pass filter configured to receive the supply voltage, and pass a signal component of the electric signal having a higher voltage than a reference voltage.

14. The semiconductor memory device of claim 13, wherein the receiving unit of the memory device further comprises:
- a regulator configured to receive information about the detected period of the control signal from the receiver, and maintain a voltage level of the reference voltage regardless of the period of the control signal by transmitting the supply voltage to the signal pass filter.

15. The semiconductor memory device of claim 13, wherein the receiving unit of the memory device further comprises:
- a voltage level converter configured to convert a voltage level of the signal component of the electric signal passed through the signal pass filter into a voltage level for the memory device.

16. The semiconductor memory device of claim 13, wherein the memory device is connected to the controller by an optical fiber waveguide, a polymer waveguide, or a printed circuit board (PCB).

* * * * *